March 10, 1953     G. J. LAUER     2,630,665
LAWN EDGER WITH MOTOR CASE AS THE WHEEL
Filed Aug. 3, 1950
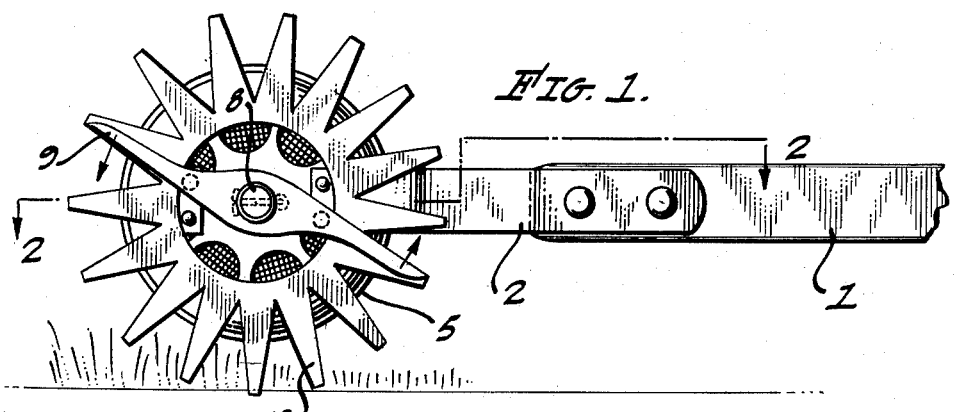
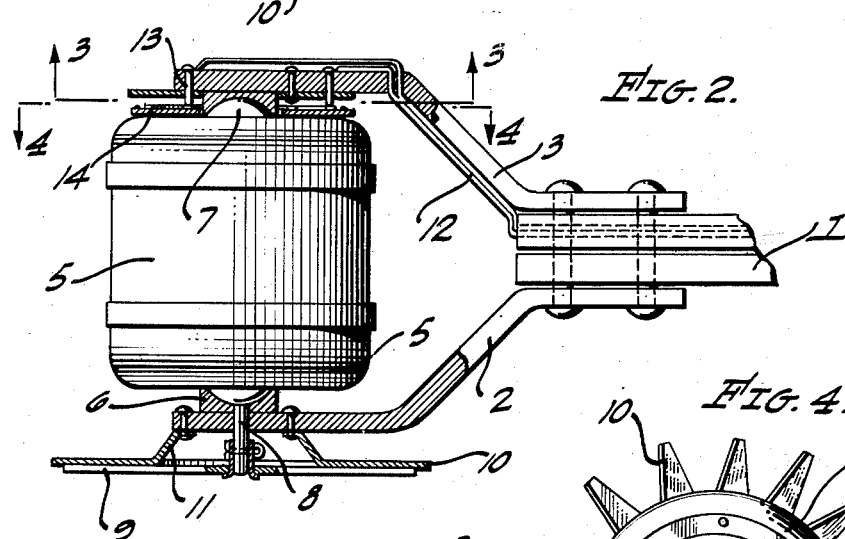
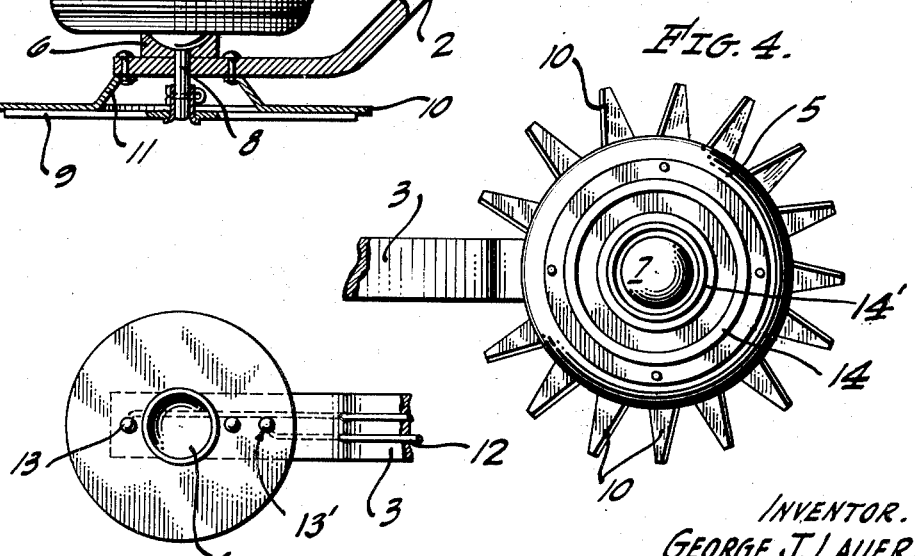
INVENTOR.
GEORGE J. LAUER,
BY
ATTORNEY.

Patented Mar. 10, 1953

2,630,665

UNITED STATES PATENT OFFICE 2,630,665

LAWN EDGER WITH MOTOR CASE AS THE WHEEL

George J. Lauer, Long Beach, Calif.

Application August 3, 1950, Serial No. 177,378

3 Claims. (Cl. 56—25.4)

1

This invention relates to a lawn edger or trimmer in which the edging cutter is motor driven and in which the case of this driving motor is utilized as a wheel to support the edger.

An object of my invention is to provide a motor driven edger in which the case of the motor is rotatably mounted in the frame of the device, the case of the motor thus supporting the edger and acting as a freely rotatable wheel.

A feature of my invention resides in the mounting of the electric motor so that when the edger is used as a trimmer and where the motor housing is not in contact with the ground in this instance, the motor housing or case will not revolve as a wheel but will be stationary; the cutter blade will revolve whether the motor housing is rotating or not.

Other objects, advantages and features of invention may appear from the accompanying drawing, the subjoined detailed description and the appended claims.

In the drawing

Figure 1 is a side elevation of my lawn edger.

Figure 2 is a partial sectional view taken on line 2—2 of Figure 1.

Figure 3 is a sectional view taken on line 3—3 of Figure 2.

Figure 4 is a sectional view taken on line 4—4 of Figure 2.

Referring more particularly to the drawing, the numeral 1 indicates a handle by means of which the edger can be pushed along the edge of a lawn, or the like. This handle is of usual construction and is well known. A pair of arms 2—3 are secured to the handle 1 and form a fork between which a motor 5 is mounted. This motor is of usual and well known design and may be either A. C. or D. C., or other type and in any instance is provided with an outer shell or case, all of which is usual and well known.

The arms 2—3 are each provided with a cup bearing 6, each bearing receiving a hemispherical journal 7 on the motor case 5. The journal 7, entering the bearing 6, will thus journal the motor case 5 and permit this case to rotate freely and, therefore, act as a wheel when the trimmer is pushed over the ground. The armature shaft 8 projects from the motor 5 and the cutter arm 9 is secured to the outer end of the shaft. The cutter arm 9 cooperates with the star wheel 10, which is stationary. The star wheel 10 is attached to the arm 2 by means of fingers or brackets 11.

To conduct current to the motor 5 from the wires 12 it is necessary to provide a sliding contact since the case of the motor may rotate. I thus provide a pair of brushes 13, 13' which project inwardly from the arm 3. These brushes engage one of the contact rings 14, 14' mounted on one face of the motor 5. Thus, it will be evident that the motor case can rotate freely and current will still be conducted to it so that the

2 armature shaft 8 can rotate and drive the cutter arm 9. The motor 5 does not necessarily have to be an electrical motor. It is possible that a rotary motor of other types can be used, assuming that the case can be mounted, as herein described, so as to freely rotate in the arms 2—3.

Having described my invention, I claim:

1. A lawn edger and trimmer comprising a handle, a pair of arms attached to the handle and forming a fork, a cup bearing on the opposed faces of each of said arms, an electric motor including a ground engaging housing mounted between said arms, journals on the housing fitted in the cups, whereby said housing is freely rotatable on said arms, contact rings on the motor, a brush engaging each contact ring, a star wheel fixedly mounted on one of said arms, a cutter blade mounting on one face of the star wheel, an armature shaft extending from the motor through said star wheel, said cutter blade being secured to the armature shaft.

2. A lawn edger and trimmer comprising a handle, a pair of arms attached to the handle and forming a fork, a cup shaped bearing on the opposed faces of each of said arms, an electric motor including an outer cylindrical ground engaging housing mounted between said arms, a journal on each end of the housing, said journals being fitted in said cups whereby said housing is freely rotatable on said arms, contact rings on said housing, a brush engaging each contact ring, a star wheel fixedly mounted on one of said arms, an armature rotatably mounted in the housing, an armature shaft extending from said armature through said star wheel, a cutter blade fixedly secured to the armature shaft, and bearing against one face of the star wheel.

3. A lawn edger and trimmer comprising a handle, a fork fixedly attached to the lower end of said handle, a bearing cup on the opposed faces of said fork, an electric motor mounted in said fork, an outer ground engaging case on said motor, and an armature in said motor, bearings on the case of the motor fitted in said cups, whereby the case of the motor is freely rotatable in the fork, a stationary cutter blade fixedly mounted on said fork, a rotating cutter blade, and means mounting the rotating cutter blade on the armature.

GEORGE J. LAUER.

REFERENCES CITED

The following references are of record in the file of this patent:

UNITED STATES PATENTS

| Number | Name | Date |
|---|---|---|
| 1,241,748 | McClure | Oct. 2, 1917 |
| 2,150,833 | Hockett | Mar. 14, 1939 |
| 2,484,276 | Eberhart | Oct. 11, 1949 |
| 2,512,132 | Ayer | June 20, 1950 |
| 2,525,944 | Ralston | Oct. 17, 1950 |